United States Patent
Oren et al.

(10) Patent No.: US 9,787,806 B2
(45) Date of Patent: Oct. 10, 2017

(54) DIGITAL DISTRIBUTED ANTENNA SYSTEM

(71) Applicant: AVAGO TECHNOLOGIES GENERAL IP (SINGAPORE) PTE. LTD., Singapore (SG)

(72) Inventors: Amit Oren, Los Altos Hills, CA (US); Lowell D. Lamb, San Ramon, CA (US); Fredrik Karl Olsson, Cupertino, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/968,785

(22) Filed: Dec. 14, 2015

(65) Prior Publication Data

US 2016/0174128 A1     Jun. 16, 2016

Related U.S. Application Data

(60) Provisional application No. 62/091,725, filed on Dec. 15, 2014, provisional application No. 62/264,084, filed on Dec. 7, 2015.

(51) Int. Cl.
*H04W 4/00*     (2009.01)
*H04L 29/08*     (2006.01)
(Continued)

(52) U.S. Cl.
CPC .......... *H04L 69/326* (2013.01); *H04L 12/189* (2013.01); *H04L 12/4633* (2013.01); *H04W 28/0236* (2013.01)

(58) Field of Classification Search
CPC . H04L 69/326; H04L 12/4633; H04L 12/189; H04W 28/0236
(Continued)

(56) References Cited

U.S. PATENT DOCUMENTS

| | | | |
|---|---|---|---|
| 6,493,538 B1 * | 12/2002 | Jabbarnezhad .... | H04B 7/18584 455/12.1 |
| 2002/0080070 A1 * | 6/2002 | Harles ................... | G01S 13/325 342/458 |

(Continued)

OTHER PUBLICATIONS

U.S. Appl. No. 61/942,831, filed Feb. 21, 2014.*

*Primary Examiner* — Chuong T Ho
(74) *Attorney, Agent, or Firm* — Oblon, McClelland, Maier & Neustadt, L.L.P.

(57) ABSTRACT

A system may distribute radio networking traffic from a base station to one or more radio units in a bi-directional link. The system may transport the radio networking traffic over a digital network. The system may include a front-haul unit coupled to the radio units and in communication with the base station. The front-haul unit may encapsulate access signals from the base station within digital transport streams for transport over the digital network. The front-haul unit may multicast digital transport transmission streams to multiple radio units in a virtual cell. The digital transport streams may contain combined received access signals from multiple service providers in a neutral-host configuration. The radio units may map encapsulate incoming radio signals for return transport to the front-haul unit and then on the base station. The front-haul unit may transport data over the network to support wireless local area network service at the radio units.

19 Claims, 8 Drawing Sheets

(51) Int. Cl.
*H04L 12/18* (2006.01)
*H04L 12/46* (2006.01)
*H04W 28/02* (2009.01)

(58) Field of Classification Search
USPC .................................... 370/329, 330, 338
See application file for complete search history.

(56) References Cited

U.S. PATENT DOCUMENTS

| | | | |
|---|---|---|---|
| 2003/0022668 A1* | 1/2003 | Jabbarnezhad | H04B 7/18584 455/426.1 |
| 2007/0209057 A1* | 9/2007 | Musson | H04H 20/42 725/111 |
| 2010/0011397 A1* | 1/2010 | Baran | H04L 29/06027 725/90 |
| 2014/0273884 A1* | 9/2014 | Mantravadi | H04B 1/38 455/73 |
| 2015/0245409 A1* | 8/2015 | Medapalli | H04W 76/025 370/329 |

* cited by examiner

DIGITAL DISTRIBUTED ANTENNA SYSTEM

PRIORITY CLAIM

This application claims priority to provisional application Ser. No. 62/091,725, filed Dec. 15, 2014 and to provisional application Ser. No. 62/264,084, filed Dec. 7, 2015, each of which are entirely incorporated by reference.

TECHNICAL FIELD

This disclosure relates to wireless networking technologies. This disclosure also relates to antenna systems for wireless networking technologies.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries. Extending service to environments of poor or non-existent connectivity will continue to drive consumer demand for mobile devices and associated services.

DETAILED DESCRIPTION

The disclosure below concerns techniques and architectures for distribution of wireless services in areas that may benefit from customizable local antenna positioning. For example, areas such as buildings, transit tunnels, bunkers, towers, and/or other venues which may be more effectively covered by a customized radio cell deployment as opposed to blanket macrocell type coverage. Further, flexible geographic distribution of cellular service signals, e.g., access signals from the base station or incoming signals from the cellular device, may allow for efficient allocation of radio bandwidth resources. For example, an area covered by a single macrocell using multiple frequency bands to support multiple client devices may be replaced by a distributed antenna system with more localized radio distribution and greater capacity for geographic reuse of frequency bands. Thus, in some cases, a distributed antenna system may be able to service the same area as a macrocell using fewer frequency bands.

A front-haul unit (FHU) may receive access signals, e.g., wireless connectivity and wireless data signals, from one or more base station units. The base station units may be associated with one or more service providers, one or more radio access technologies (RATs), or any combination thereof. The FHU may use radio-to-network protocols (e.g., radio over Ethernet (RoE) IEEE1904.3) to distribute the access signals via digital transport streams to one or more radio units (RU). The RUs may then provide multi-service/multi-RAT connectivity to a customizable area. For example, RUs may be placed on different floors of a building where different RUs provide a selected set of services/RATs to different floors.

In an analog distribution system, such as a distributed antenna system (DAS), a base station may provide an access signal to an input. Passive or active components, such as coaxial cables, couplers, radio heads, repeaters, and/or other components may distribute the access signal to an array of antennas. However, because the signal is analog, digital switching, routing, error correction, and/or other digital signal processing may not necessarily be integrated with the analog system. Further, existing or widely available high speed cabling may not necessarily be compatible with the analog deployment. For example, CAT5e Ethernet cable may not necessarily support transport of cellular (2G/3G/4G (LTE)/5G) signals. Thus, it may be advantageous to deploy digital FHUs and RUs able to digitally distribute the access signals and incoming signals on a reverse link, as discussed below.

Figure 1:
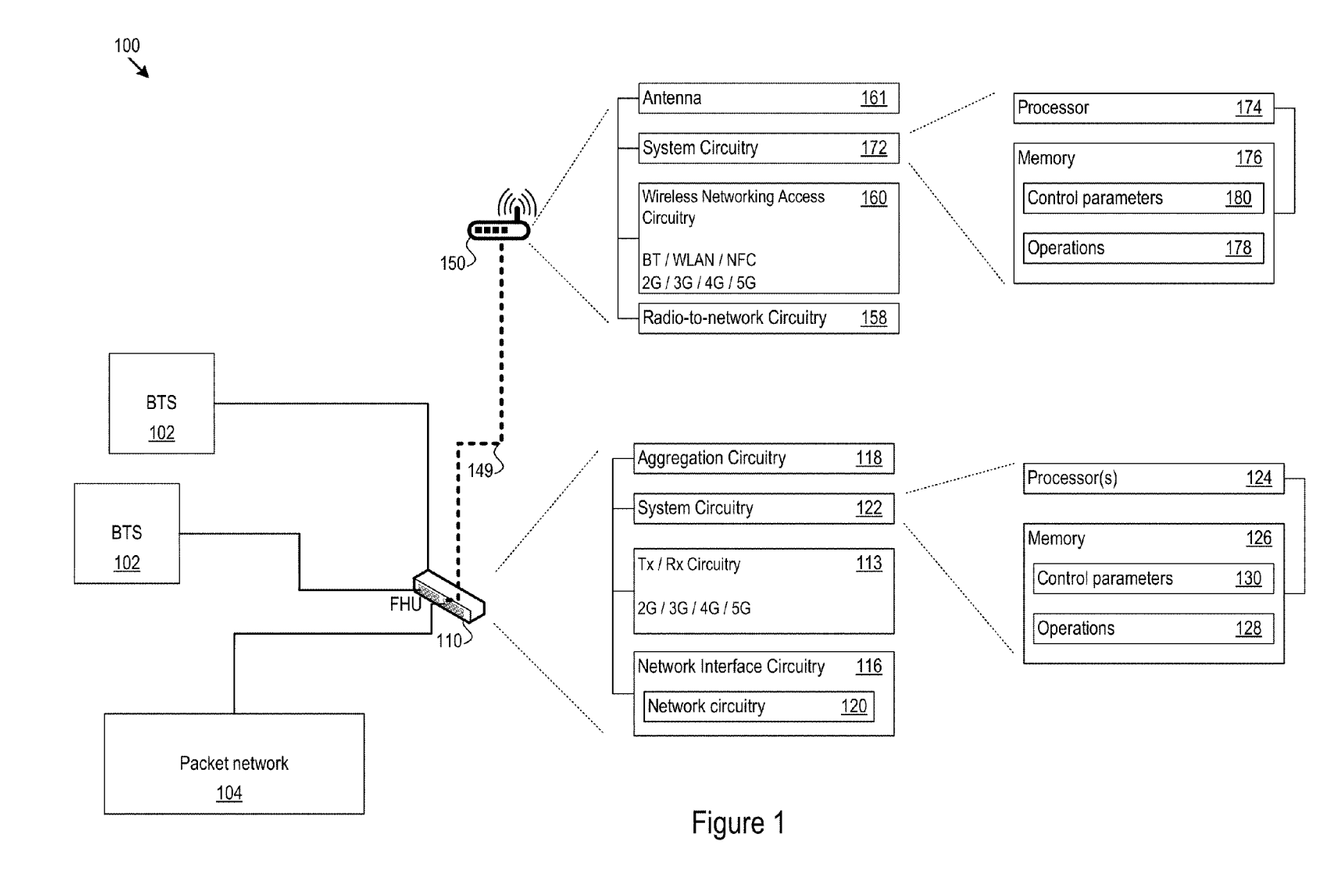
FIG. 1 shows an example digital radio distribution system (DRDS).

FIG. 1 shows an example digital radio distribution system (DRDS) 100. A FHU 110 may be coupled to one or more RUs 150. The FHU may include radio Tx/Rx circuitry 113 to receive the access signals from and send incoming signals to the base stations 102. The FHU may also include network interface circuitry 116 to couple the FHU to one or more packet networks 104, e.g., Ethernet, and/or other data or packet networks. The FHU may include aggregation circuitry 118 to code the access signals in a format for transmission over the network link 149 between the RUs and FHUs. The network link 149 may include fiber, microwave, twisted pair (e.g., CAT5e, CAT6a), coax, and/or other physical networking media. The aggregation circuitry may include radio-to-network systems, e.g., RoE mappers or other radio-to-network functionality, to support access signal and incoming signal digital transport. The FHU may also include bridge circuitry 120 to translate the data network traffic over the network link 149. For example, the bridge circuitry 120 may include a router, network switch, and/or other networking device for forwarding traffic between networks or network domains.

The FHU may also include system circuitry 122. System circuitry 122 may include processor(s) 124 and/or memory 126. Memory 126 may include operations 128 and control parameter 130. Operations 128 may include instructions, e.g., software, algorithms, or other instructions, for execution on one or more of the processors 124 to support the functioning the FHU, for example, the operations may regulate two-way traffic between the RUs and base stations or data networks. The control parameters 130 may include parameters or support execution of the operations 128. For example control parameters may include network protocol settings, bandwidth parameters, radio frequency mapping assignments for various RATs, and/or other parameters.

RU 150 may include radio-to-network circuitry 158, e.g., RoE mappers, such as, interworking functions that bridge between Ethernet and native radio transmissions protocols, or other radio-to-network circuitry, to couple to the network link 149 decode the received access signals and wireless networking access circuitry 160 to couple the network data received over the network link into a wireless local area network (WLAN) signal for broadcast over the RU antenna 161 along with the decoded access signals.

The RU may also include system circuitry 172. System circuitry 172 may include processor(s) 174 and/or memory 176. Memory 176 may include operations 178 and control parameters 180. Operations 178 may include instructions, e.g., software, algorithms, or other instructions, for execution on one or more of the processors 174 to support the functioning the RU. For example, the instructions may include applications for extracting sampled access signals from digital transport streams, reconstructing access signals from sample access signals, encapsulating sampled incoming signal data in to digital transport stream, or performing other radio signal transport or decoding operations. The control parameters 180 may include parameters or support execution of the operations 178. For example control parameters may include network protocol settings, bandwidth parameters, radio frequency mapping assignments for various RATs, and/or other parameters. The system circuitry 122, 172 of the FHU 110, RU 150 on or both may include advanced signal processing functionality, such as compression or Layer-1 processing functionality.

In various implementations, different RATs may be forwarded to different RUs. Because the DRDS may use routing and addressing technologies, some RATs received at the FHU may be sent to selected RUs rather than necessarily being sent to the entire set of RUs connected to the FHU. In addition, radio channels and resources may be reconfigured by the FHU or BTS in real time. For example, if one RAT or service is unused by devices currently connected to an RU, the FHU may reallocate the radio resource for other services/RATs. For example, a band used for a data channel of a particular RAT may be reassigned while no devices are active on the particular RAT. A pilot/paging channel band may remain open waiting for incoming devices. Once, a device establishes a link to the particular RAT, the resources may be reassigned by the FHU.

Figure 2:
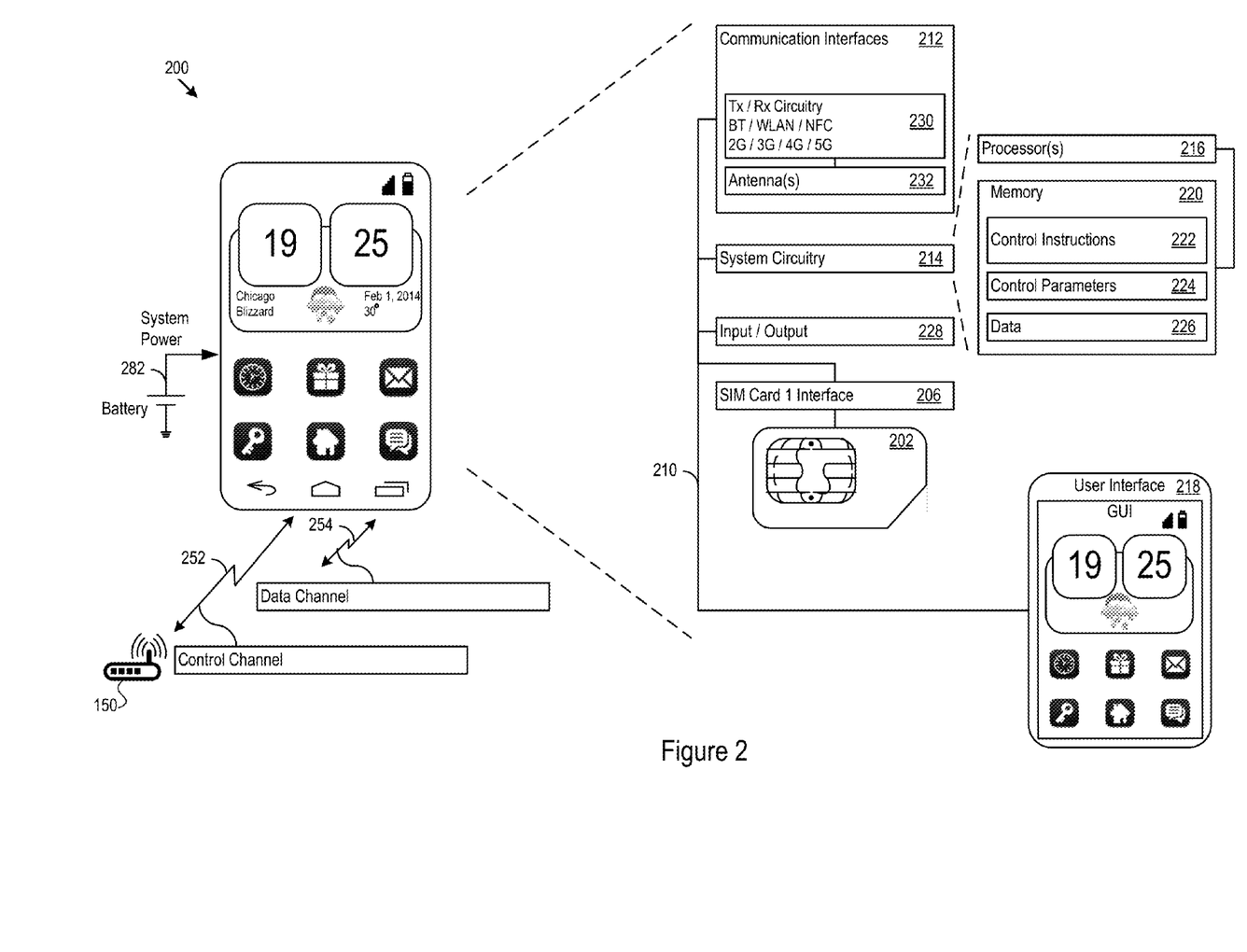
FIG. 2 shows an example mobile device which may couple to the RU for radio access.

FIG. 2 shows an example mobile device 200 which may couple to the RU for radio access. The mobile device 200 is a smartphone in this example, but the mobile device may be any mobile device, such as, but not limited to, a smartphone, smartwatch, smartglasses, tablet, laptop computer, or other device. Accordingly, the smartphone example described below provides just one example context for explaining the architectures and techniques.

As one example, the mobile device 200 may be a 2G, 3G, 4G (LTE/LTE-A), 5G, or faster cellular phone capable of making and receiving wireless phone calls, and transmitting and receiving data using 802.11a/b/g/n/ac/ad ("WiFi"), Bluetooth (BT), Near Field Communications (NFC), or any other type of wireless technology. The mobile device 200 may also be a smartphone that, in addition to making and receiving phone calls, runs any number or type of applications.

The example mobile device 200 may be in communication with the RU 150. The RU 150 and mobile device 200 establish communication links such as the control channel 252 and the data channel 254, and exchange data. In this example, the mobile device 200 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system circuitry 214, and a user interface 218. The system circuitry 214 may include any combination of hardware, software, firmware, or other logic. The system circuitry 214 may be implemented, for example, with one or more systems on a chip (SoC), application specific integrated circuits (ASIC), discrete analog and digital circuits, and other circuitry. The system circuitry 214 is part of the implementation of any desired functionality in the mobile device 200. In that regard, the system circuitry 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system circuitry 214 may include one or more processors 216 and memories 220. The memory 220 stores, for example, control instructions 222 that the processor 216 executes to carry out desired functionality for the mobile device 1200. The control parameters 224 provide and specify configuration and operating options for the control instructions 222. The memory 220 may also store any BT, WiFi, 3G, or other data 226 that the mobile device 200 will send, or has received, through the communication interfaces 212.

In various implementations, the system power may be supplied by a power storage device, such as a battery 282.

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulation schemes (e.g., QPSK, 16-QAM, 64-QAM, or 256-QAM), frequency channels, bit rates, and encoding schemes. As one specific example, the communication interfaces 212 may include transceivers that support transmission and reception under the 2G, 3G, BT, WiFi, Universal Mobile Telecommunications System (UMTS), High Speed Packet Access (HSPA)+, 4G/Long Term Evolution (LTE/LTE-A), 5G or future standards. The techniques described below, however, are applicable to other current or future wireless communications technologies whether arising from the 3rd Generation Partnership Project (3GPP), GSM Association, 3GPP2, IEEE, or other partnerships or standards bodies.

Figure 3:
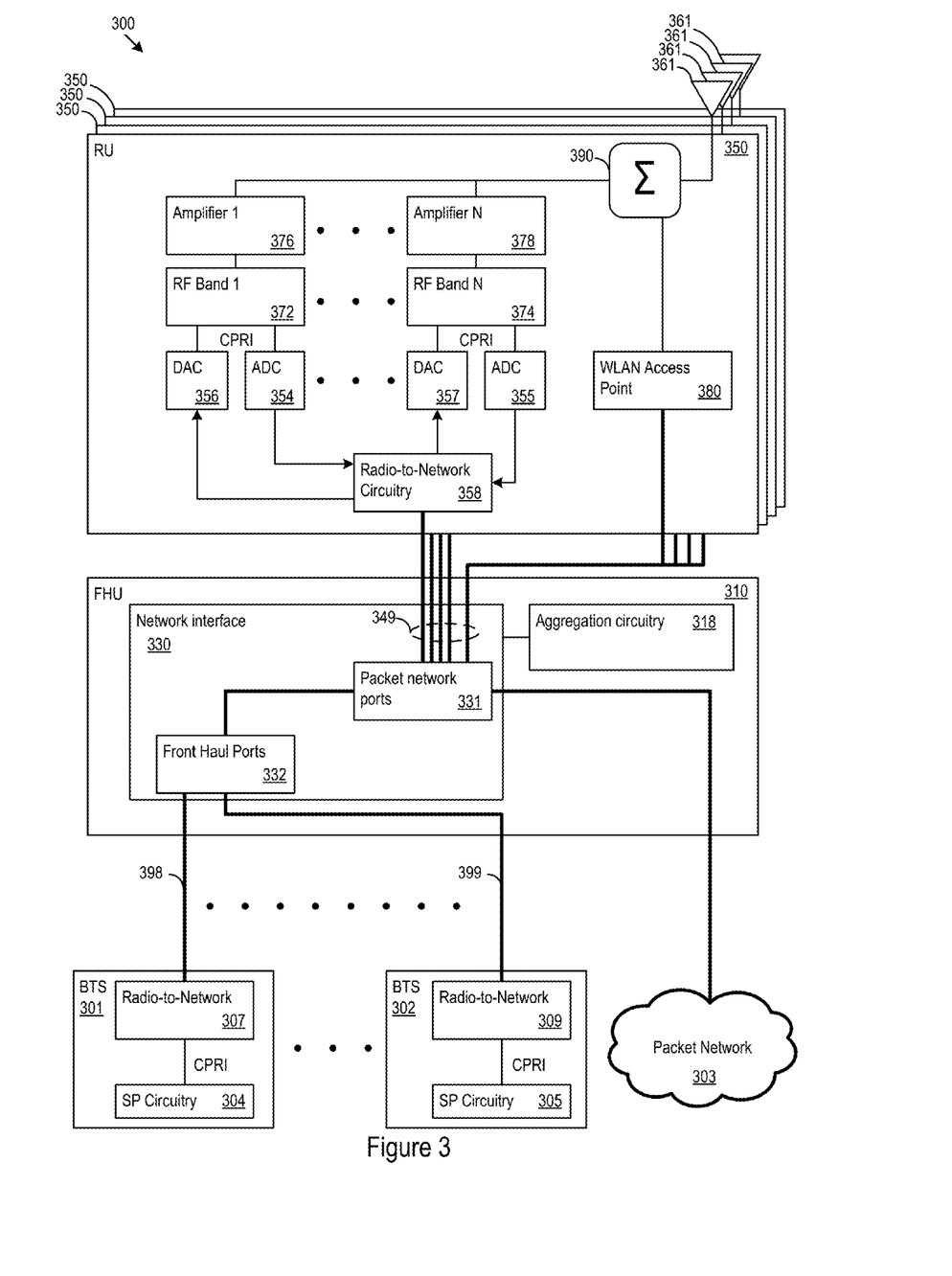
FIG. 3 shows an example DRDS.

FIG. 3 shows an example DRDS 300. In the example DRDS 300, base stations (BTS) 301, 302 and a packet network 303 are coupled to a FHU 310. The BTSs 301, 302 may be coupled to the FHU 310 via front haul network links 399, 398. The front haul network links 399, 398 may originate at front haul ports 332 terminate at radio-to-network circuitry 307, 309 in the BTSs 301, 302 and connect to the signal processing (SP) circuitry 304, 305 of the BTSs 301, 302 via a common public radio interface (CPRI) connection. Additionally or alternatively, the FHU may couple directly to the BTSs 301, 302 via a CPRI connection. The front haul network links 399, 398 may be may be established over virtually any medium, such as optical, coaxial, copper, wireless, or other physical medium. In some cases, a medium may be selected to facilitate long distance transport because the BTSs may not necessarily be located within range of Ethernet, e.g., ~100 meters, relative to the front haul unit. The aggregation circuitry 318 of the FHU may receive access signals from the BTSs 301, 302. The aggregation circuitry 318 may receive the access signals within digital transport streams, as radio signals, or via other transport schemes. The aggregation circuitry 318 then may generate digital transport streams based on the received access signals. The digital transport stream output of the aggregation circuitry 318 may be fed into packet network ports 331 of network interface 330 for transport to the RUs 350 over the network link 349. The network link 349 may include fiber, microwave, twisted pair (e.g., CAT5e, CAT6a), coax, and/or other physical networking media.

The RUs 350 may couple to FHU 310 over the network link 349. The RU 350 may support multiple radio bands for broadcast of multiple radio technologies. The radio-to-network circuitry 358 at the RUs 350 may decode the Ethernet signals and extract sampled access signals. The sampled access signals may be used to reconstruct, e.g., via DACs 356, 357, analog access signals for transmission from the antenna. The radio-to-network circuitry 358 may send the access signals over the RF bands 372, 374. A CPRI connection may be used to carry the decoded signals to the RF channel inputs. Amplifiers 376, 378 may boost the RF power of the signal for transmission. The RF channels and output from the WLAN access point 380 may be multiplexed at the RF combiner 390. The combined RAT output may be transmitted over the multi-band antenna 361. Similarly incoming signals may be received at the multi-band antenna 361, sampled, e.g., via ADCs 354, 355, and sent in a reverse-link to the BTSs 301, 302 and/or packet network 303 by way of the FHU 310.

The connection to multiple-technologies and multiple-BTSs may be used to implement a neutral-host configuration or a shared radio access network. In a neutral-host configuration, the access signals from multiple service providers' BTSs may be multiplexed/demultiplexed into feeds for individual RU antennas by the aggregation circuitry 318.

In some implementations, a BTS may be integrated with the FHU. In such an integrated BTS-FHU system, the FHU may produce the access signals sent to the RUs for transmission, and digital signal transport between the BTS and FHU may be obviated.

In various implementations existing, Ethernet functionality may be used by the system. Ethernet multicast, synchronization (e.g., IEEE 1588, synchronous Ethernet (SyncE)), security, forward error correction, power-over-Ethernet (PoE), and/or other Ethernet functionality may be implemented by the network interface 330 and radio-to-network circuitry 358. For example, the RU 150, 350 devices may support PoE functionality. Thus, the RUs may be powered through the RU network line for ease of deployment.

Figure 7:
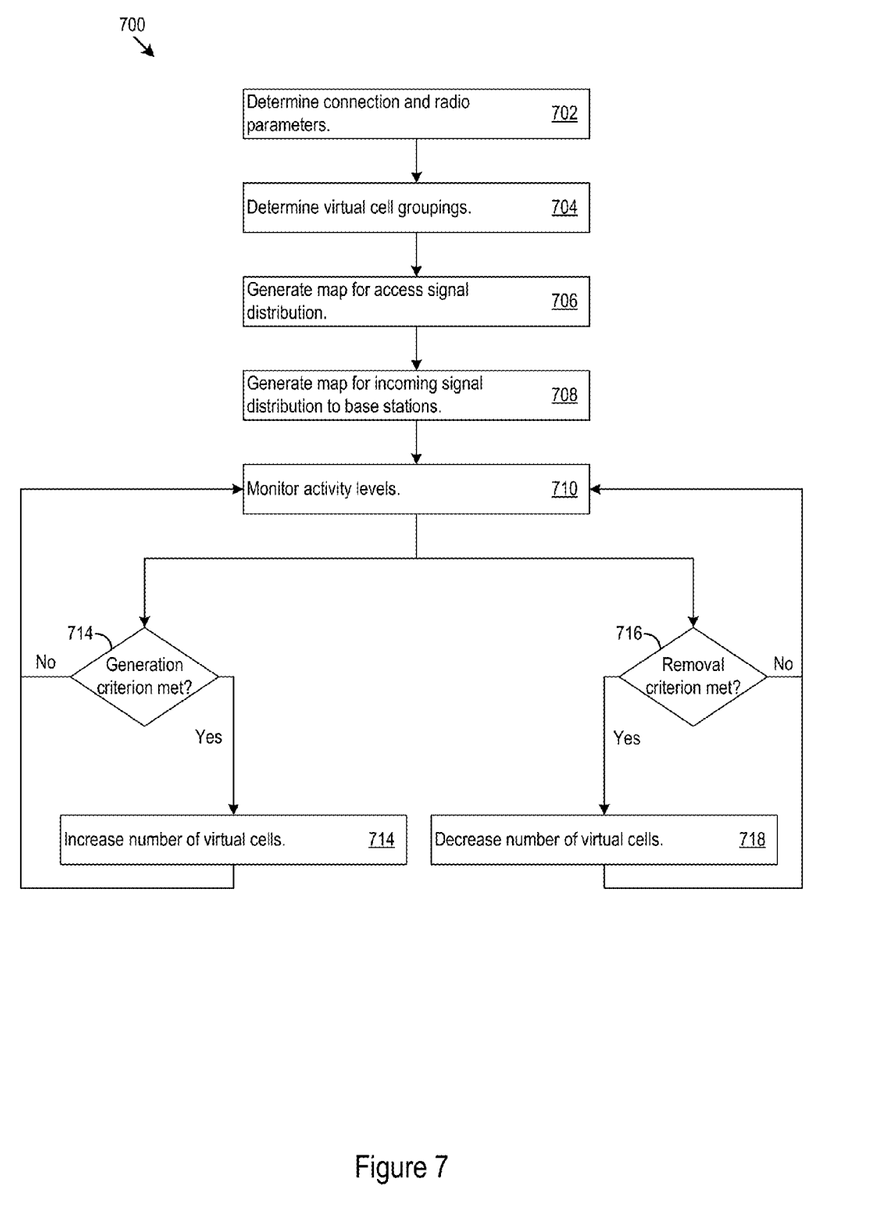
FIG. 7 shows example virtual cell logic.

Because the service/RAT configurations of the RUs may be individually set for even if the RUs are connected to the same FHU, the DRDS may be used to provide multiple virtual cells. The aggregation circuitry may provision the virtual cells using the virtual cell logic 700, described below.

A DRDS system may use a variety of BTS to FHU connection technologies, including fiber, microwave, twisted pair (e.g., CAT5e, CAT6a), coax, and/or other physical networking media. Similarly, the network link between the FHU and RUs may use various physical media for transport.

In addition to wireless traffic, a FHU unit can also provide aggregation and transport of fixed line traffic (e.g., LAN connectivity, WAN connectivity). For example, the FHU may operate as a switch on an enterprise network and route traffic accordingly. Additionally or alternatively, the FHU 310 may include a broadband modem and provide backhaul connectivity for LAN and WLAN networks.

Figure 4:
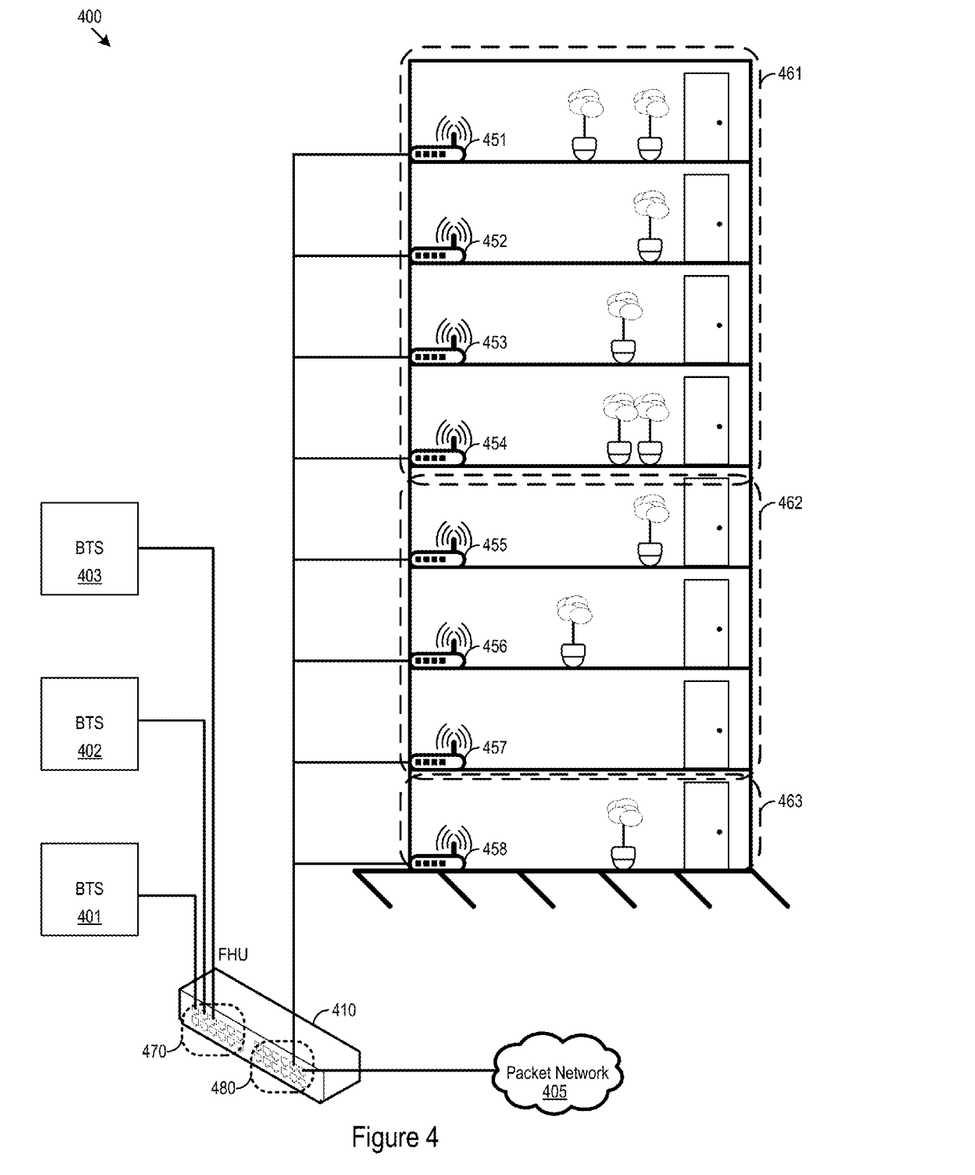
FIG. 4 shows an example DRDS environment.

FIG. 4 shows an example DRDS environment 400. In the example DRDS environment 400, a FHU 410 connects via front haul ports 470 to multiple BTSs 401, 402, 403. The FHU 410 is coupled to multiple RUs 451, 452, 453, 454, 455, 456, 458 and a packet network 405 via network interface ports 480. The RUs may be individually provisioned and/or provisioned in groups, as discussed below, to form virtual cells 461, 462, 463. Individual ones of the virtual cells may have common services/RATs throughout the coverage area of the virtual cell.

Figure 5:
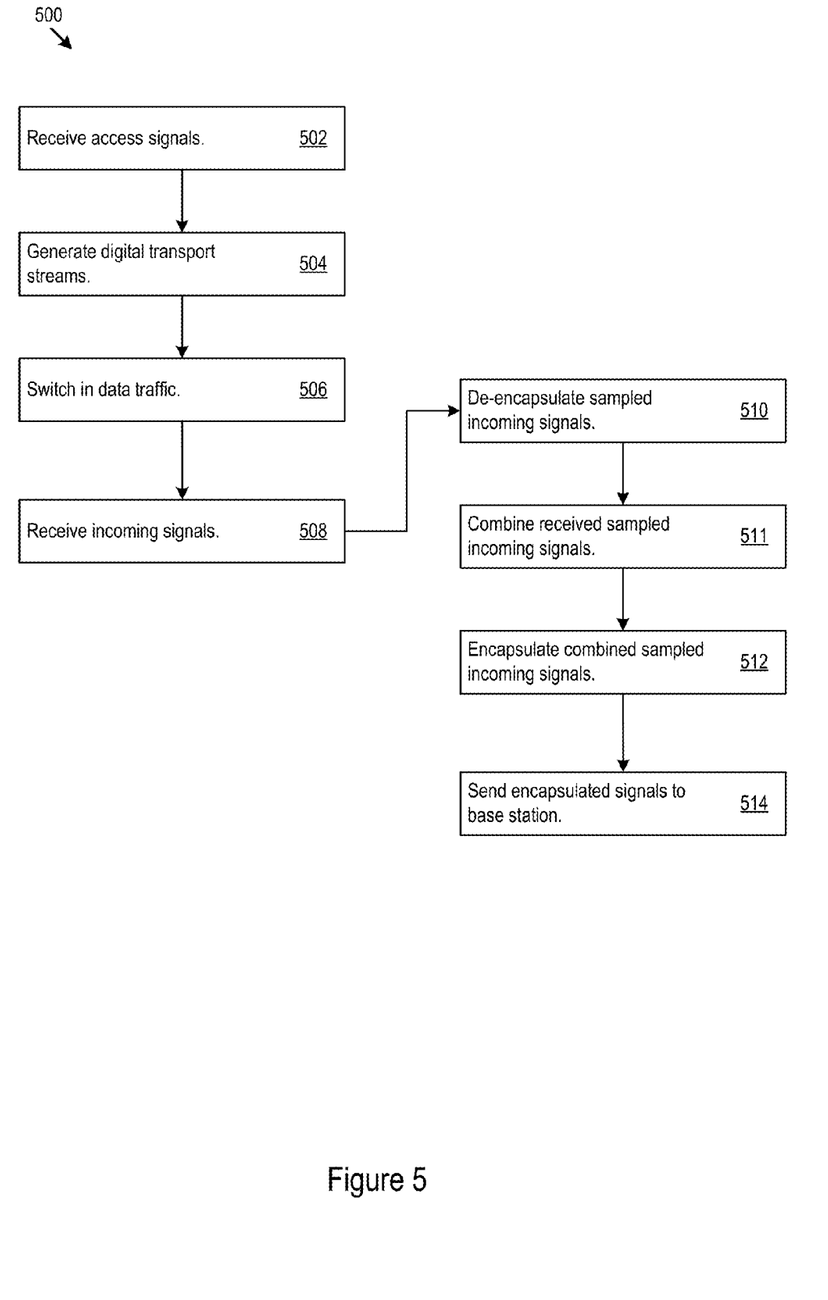
FIG. 5 shows example DRDS logic.

FIG. 5 shows example DRDS logic 500 which may be implemented on aggregation circuitry 318 of the FHU 310. The DRDS logic 500 may receive, at a network interface port, access signals from one or more base stations (502). For example, the BTSs may send the access signals to the aggregation circuitry 318 encapsulated within digital transport streams, such as RoE transport streams. The DRDS logic 500 may generate digital transport streams based the access signals (504). For example, the DRDS logic 500 may re-encapsulate the access signals into Ethernet stream for communication to the RUs 350. In an example scenario, the DRDS logic 500 extract sampled access signals from a received transport stream from a BTS, and then, use aggregation circuitry to place the sample access signals into another digital transport stream. The DRDS logic 500 may then send the digital transport stream to the RUs based on virtual cell provisioning. The DRDS logic 500 may switch data traffic in with the digital transport stream packets (506). For example, the DRDS logic 500 may forward Ethernet traffic to support WLAN connections at the RUs 350.

The DRDS logic 500 may receive incoming signals from the RUs over the network (508). The incoming signals may include return cellular data/voice and/or return direction WLAN traffic. The incoming signals may be sent to the DRDS logic 500 encapsulated within digital transport streams, e.g., RoE streams. The RU may send the streams over a network link between the FHU and RU. The digital transport streams may be encoded into data frames of the network communication protocol of the network link, e.g., Ethernet data frames.

The incoming signals The DRDS logic 500 may decapsulate sampled incoming signals from the RUs (510). The DRDS logic 500 may combine received sampled incoming signals from the RUs into combined sampled incoming signals (511). For example, the DRDS logic 500 may combine multiple sampled incoming signals to generate a single combined sample of a given radio frequency band. Thus, incoming signals from multiple RUs may be combined with one another to generate a single sampled incoming signal for transport to the BTS. In an example scenario, the DRDS logic 500 may combine the sampled incoming signals such that RUs grouped into the same virtual cell have their sampled incoming signals sent on the same combined sampled incoming digital transport stream. Accordingly, a BTS may receive a combined sampled incoming digital transport stream for each of the virtual cells it manages. Additionally or alternatively, sampled incoming signals may be combined according to RAT or frequency band. For example, sampled incoming signals within the same frequency band may be combined, e.g., if the sampled incoming signals come from RUs in the same virtual cell. Further, sampled incoming signals using the same RAT may be combined, e.g., if the sampled incoming signals come from RUs in the same virtual cell.

The DRDS logic 500 may encapsulate the sampled combined incoming signals into combined incoming digital transport streams for transport to the BTSs (512). For example, DRDS logic 500 may encapsulate the sample combined incoming signals using a RoE protocol. Once encapsulated, the DRDS logic 500 may send the combined incoming digital transport streams on network data frames to the BTSs according to the virtual cell mapping as discussed below with regard to FIG. 7 (514).

The data for the packet network 303 transported in parallel to the digital transport streams may not necessarily need decoding since the WLAN traffic may already be formatted for transit over a packet network when originating from a source device and/or source packet network.

Figure 6:
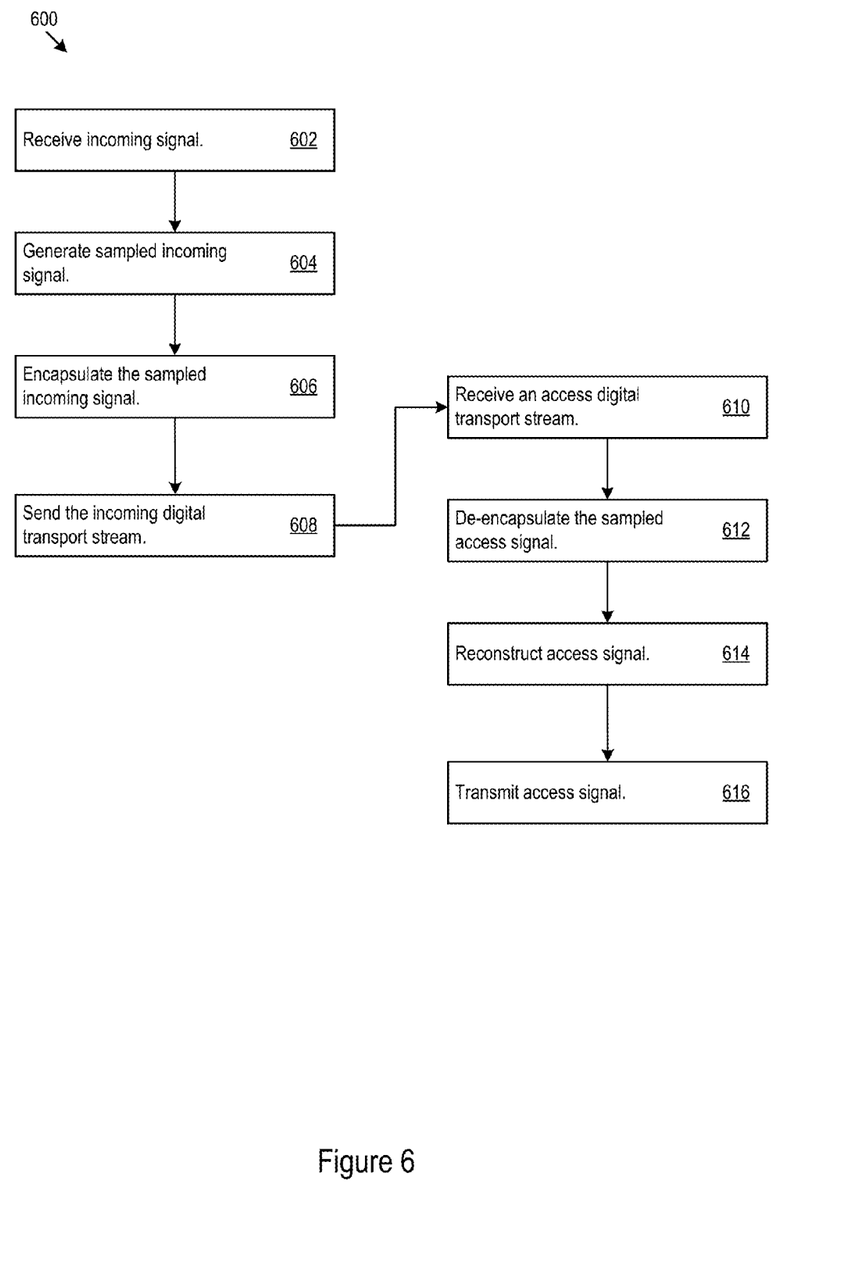
FIG. 6 shows example radio unit logic.

Referring again to FIG. 3, the RUs 350, may exchange access and incoming signals with the BTSs 301, 302, by way for the FHU 310. The access and incoming signals may be exchanged using digital transport streams which may be received and sent from the ports of network interface 330. The RUs 350 may transmit the access signals after extraction. The RUs 350 receive the incoming signals over multi-band antenna 361 and may sample and encapsulate the incoming signals for return transmission to the BTSs 301, 302 by way of the FHU 310. Referring now to FIG. 6, example RU logic 600, e.g., for handling access and incoming signals, is shown. The RU logic 600 may receive an incoming signal from multi-band antenna 361 (602). The RU logic 600 may sample the incoming signal to generate a sampled incoming signal (604). The digital domain sampled incoming signal can be encoded for transport as data over a network. Accordingly, the RU logic 600 may encapsulate the sampled incoming signal within an incoming digital transport stream (606). The RU logic 600 may send the incoming digital transport stream, e.g., as network data frames, to the FHU (608).

The RU logic 600 may further receive an access digital transport stream from the FHU (610). The RU logic 600 may decapsulate a sampled access signal carried within the access digital transport stream (612). The RU logic 600 may reconstruct an access signal from the sampled access signal (614). The analog-domain reconstructed access signal may be transmitted at the multi-band antenna 361 of the RU 350. Accordingly, the RU logic 600 may cause the antenna to transmit the access signal (616).

The provision of access signals to the RU and the transport of incoming signals back to the BTSs may be controlled by the virtual cell layout of the system. FIG. 7 shows example virtual cell logic 700, which may be used by the aggregation circuitry 318 to provision virtual cells among the RUs 350. The virtual cell logic 700 may determine connection and radio parameters for the RUs (702). For example, the virtual cell logic 700 may determine which RATs services provided by the BTSs may be distributed to the RUs 350. The virtual cell logic 700 may determine virtual cell groupings for the RUs (704). The virtual cell grouping may be RAT or BTS specific. Thus, the virtual cell logic 600 may group a first RU with a second RU within a virtual cell for a first RAT provided by a first BTS, but not necessarily group with the second RU for a second RAT or for a second BTS.

After determining the virtual cell groupings, the virtual cell logic 700 may generate a map for access signal distribution to the RUs (706). For example, the map may indicate which digital transport streams may be sent to the RUs by the aggregation circuitry 318. For example, for RUs within a single virtual cell, the map may indicate to the aggregation circuitry that each of the RUs should receive, e.g., via multicast, the same access digital transport stream. Thus, the RUs of a given virtual cell may transmit the same access signals received via a multicast from the FHU. Similarly, transport streams may be unicasted to RUs not necessarily within a virtual cell, and transport streams broadcasted when the full set of RUs is within a single virtual cell.

The virtual cell logic may generate a map for incoming signal distribution to the BTSs (708). In some implementations, the incoming signals may be used to enforce virtual cell membership among the RUs 350. For example, RUs 350 within a virtual cell may send incoming digital transport streams to the aggregation circuitry 318. The aggregation circuitry 318 may extract the sampled incoming signals within the transport streams and combine them into a single combined sampled incoming signal. The combined sampled incoming signal may be send to the BTS via a combined incoming digital transport stream. Therefore, the BTS receives the incoming radio signals from all the RUs within the virtual cell as a single radio signal, e.g., as if captured at a signal antenna.

In some systems, the aggregation circuitry my dynamically provision RUs to virtual cells. To support dynamic provision of RUs, the virtual cell logic 700 may monitor activity levels (710). For example, to monitor activity levels, the virtual cell logic 700 may monitor the number of mobile devices connecting to a virtual cell or exchanging radio signals with a particular RU. Additionally or alternatively, the virtual cell logic may receive an indicator from the BTS of activity levels for a virtual cell. The virtual cell logic 700 may perform a comparison between the activity levels and a virtual cell generation criterion (712). For example, a virtual cell generation criterion may include a threshold number of connected mobile devices, a threshold data throughput level, or other threshold activity level.

When the virtual cell generation criterion is met, the virtual cell logic 700 may cause the aggregation circuitry 318 to increase the number of virtual cells (714). For example, the virtual cell logic 700 may cause a virtual cell including multiple RUs to split into multiple virtual cells. Additionally or alternatively, the virtual cell logic may regroup the RUs into a new configuration with at least one additional virtual cell. As discussed below with regard to FIG. 7, increasing the number of virtual cells may allow for increased opportunity for radio resource reuse through geographic localization of coverage.

Additionally or alternatively, the virtual cell logic may perform a comparison between the activity levels and a virtual cell removal criterion (716). When the virtual cell generation criterion is met, the virtual cell logic 700 may cause the aggregation circuitry 318 to decrease the number of virtual cells (718). For example, virtual cells may be combined into a single virtual cell or regrouped in a configuration with at least one fewer virtual cell. In some cases, reducing the number of virtual cells may reduce processing complexity for BTSs and may reduce the bandwidth consumed by digital transport streams used in supporting the virtual cells.

Figure 8:
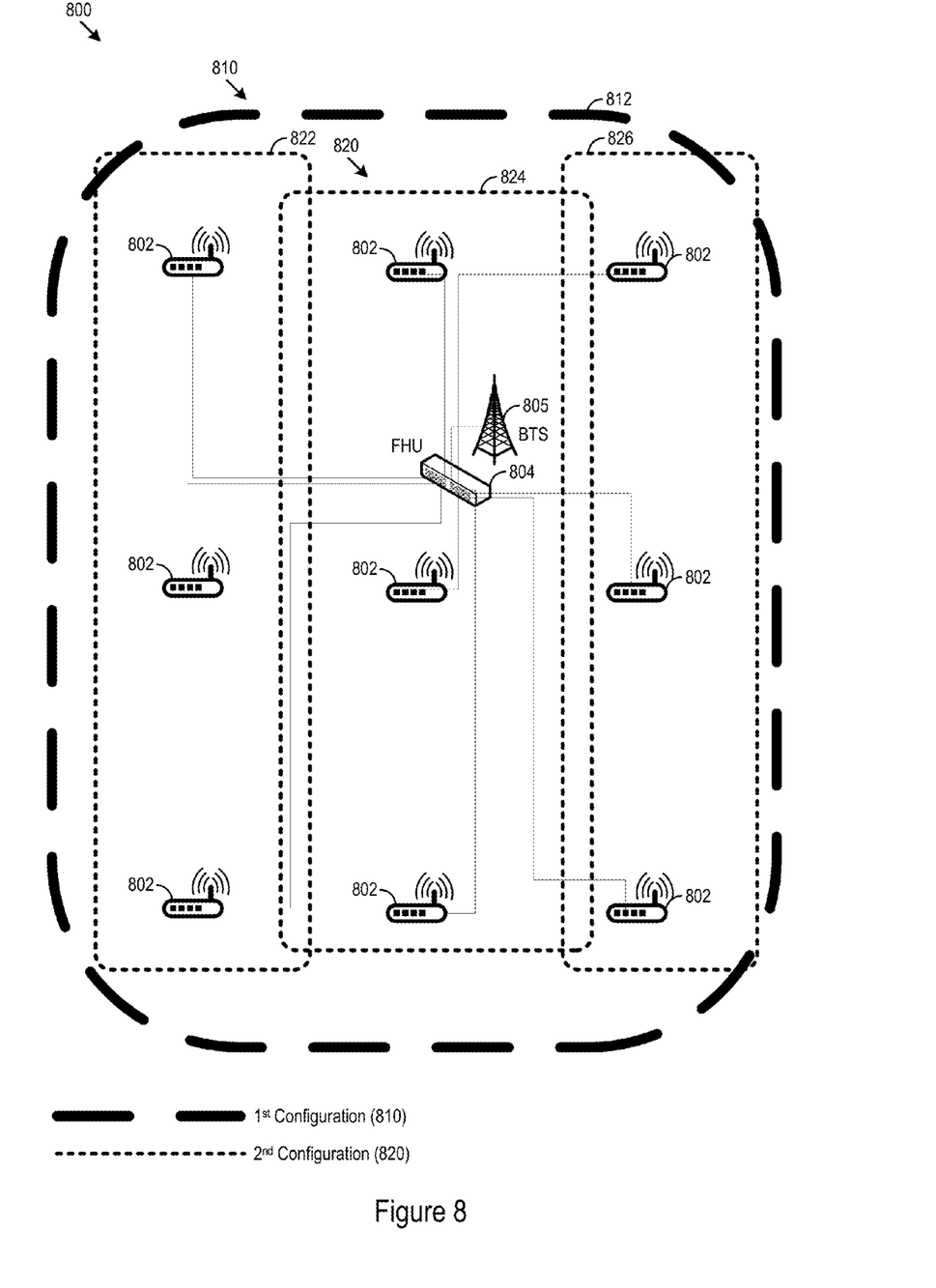
FIG. 8 shows an example area 800 covered by a DRDS.

Dynamic provisioning of virtual cells may be used to manage radio resource usage, such as spectrum reuse, in an area covered by a DRDS. Turning now to FIG. 8, an example area 800 covered by a DRDS is shown. The DRDS includes multiple RUs 802 and a FHU 804. The FHU is coupled to a BTS 805. In a first configuration 810, aggregation circuitry in the FHU 804 may place the RUs in a single virtual cell coverage area 812. In the first configuration 810, the RUs 802 may behave like a single macrocell. In a second configuration 820, the RUs 802 are grouped by the aggregation circuitry in the FHU 804 into multiple virtual cells. In the second configuration 820, virtual cell coverage areas 822 and 826 do not overlap. Thus, frequency resources between coverage areas 822 and 826 may be reused due to the lack of geographic coverage overlap. Coverage area 824 overlaps with both 822 and 826.

The virtual cell logic 700 may change coverage configurations as the activity levels, such as the density of mobile devices, changes within the area covered by a DRDS. Thus, the DRDS system facilitates flexibility in geographic deployment of radio resources at a sub-macrocell resolution, which allows for adaptation responsive to wireless activity levels and terrain-based wireless transmission obstacles.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
   an antenna configured to receive an incoming signal;
   radio-to-network circuitry configured to generate an incoming digital transport stream responsive to incoming signal by
      sampling the incoming signal to generate a sampled incoming signal;
      encapsulating the sampled incoming signal in accord with a transport protocol to generate encapsulated incoming signal data; and
      adding the encapsulated incoming signal data to the incoming digital transport stream; and
   network interface circuitry configured to send the incoming digital transport stream to aggregation circuitry configured to combine the incoming signal with a second incoming signal in a combined digital transport stream for transport to a base station.

2. The device of claim 1, where the incoming digital transport stream and the combined digital transport streams comprise radio over Ethernet (RoE) transport streams.

3. The device of claim 1, where the network interface circuitry is further configured to:
   receive a data frame from a packet network; and
   cause the antenna to transmit a wireless local area network (WLAN) radio signal carrying the data frame.

4. The device of claim 1, where:
   the network interface circuitry is further configured to receive a first access digital transport stream sent from the base station;
   the radio-to-network circuitry is configured to extract a first access signal from the first access digital transport stream; and
   the antenna is configured to transmit the first access signal.

5. The device of claim 4, where the radio-to-network circuitry is configured to extract the first access signal by:
   decapsulating a sampled access signal from the first access digital transport stream; and
   reconstructing the first access signal from the sampled access signal.

6. The device of claim 4, where:
   the network interface circuitry is further configured to receive a second access digital transport stream sent from another base station;
   the radio-to-network circuitry is configured to extract a second access signal from the second access digital transport stream; and
   the antenna is configured to transmit the second access signal in a neutral-host configuration.

7. The device of claim 6, where the antenna is configured to transmit the first access signal over a different frequency band from the second access signal.

8. A device comprising:
   network interface circuitry comprising:

a first port configured to receive a first digital transport stream from a first radio unit, the first digital transport stream configured to carry a first sampled incoming signal;

a second port configured to receive a second digital transport stream from a second radio unit, the second digital transport stream configured to carry a second sampled incoming signal; and a front haul port configured to establish a front haul network link to a base station; and aggregation circuitry coupled to the network interface circuitry, the aggregation circuitry configured to:

extract the first and second sampled incoming signals from the first and second digital transport streams;

combine the first and second sampled incoming signals to generate a combined sampled incoming signal;

generate a combined digital transport stream responsive to the combined sampled incoming signal; and cause the network interface circuitry to send the combined digital transport stream to the base station over the front haul network link.

9. The device of claim 8, where:

the network interface circuitry further comprises a third port configured to receive a third digital transport stream from a third radio unit, the third digital transport stream configured to carry a third sampled incoming signal; and the aggregation circuitry is configured to generate a virtual cell by:

generating a fourth digital transport stream responsive to the third sampled incoming signal; and causing the network interface circuitry to send the fourth digital transport stream to the base station separately from the combined digital transport stream.

10. The device of claim 8, where:

the first port is configured to receive a third digital transport stream from the first radio unit, the third digital transport stream configured to caity a third sampled incoming signal; and the aggregation circuitry is configured to:

generate fourth digital transport stream responsive to the third sampled incoming signal; and causing the network interface circuitry to send the fourth digital transport stream to another base station via another front haul port.

11. The device of claim 10, where the first sampled incoming signal comprises sampling from a different radio frequency band than sampling included in the third sampled incoming signal.

12. The device of claim 8, where the front haul port is configured to receive a fourth digital transport stream over the front haul network link, the fourth digital transport stream carrying an access sampled incoming signal.

13. The device of claim 12, where the network interface circuitry is configured to unicast the fourth digital transport stream to the first radio unit via the first port.

14. The device of claim 12, where the network interface circuitry is configured to multicast the fourth digital transport stream to the first and second radio unit via the first and second ports.

15. A method comprising:

exchanging signals with an antenna configured to:

transmit an access signal; and receive an incoming signal;

extracting the access signal from an access digital transport stream sent from a base station;

sending the access signal to the antenna for transmission; and encapsulating the incoming signal within an incoming digital transport stream for transport to aggregation circuitry, the aggregation circuitry configured to combine the incoming signal with another incoming signal within a combined digital transport stream for transport to the base station.

16. The method of claim 15, where:

extracting the access signal comprises:

decapsulating a sampled access signal from the access digital transport stream; and reconstructing the access signal from the sampled access signal.

17. The method of claim 15, where:

encapsulating the incoming signal comprises:

sampling the incoming signal to generate a sampled incoming signal;

encoding the sampled incoming signal into data frames for a network communication protocol; and generating the incoming digital transport stream from the data frames.

18. The method claim 15, further comprising:

sending the incoming digital transport stream over a packet network; and receiving the access digital transport stream over the packet network.

19. The method of claim 18, further comprising:

receiving data frames over the packet network; and causing the antenna to transmit wireless local area network (WLAN) radio signals carrying the data frames.

* * * * *

UNITED STATES PATENT AND TRADEMARK OFFICE
CERTIFICATE OF CORRECTION

PATENT NO. : 9,787,806 B2
APPLICATION NO. : 14/968785
DATED : October 10, 2017
INVENTOR(S) : Amit Oren et al.

Page 1 of 1

It is certified that error appears in the above-identified patent and that said Letters Patent is hereby corrected as shown below:

In the Claims

Column 11, Line 38, change "caity" to --carry--.

Signed and Sealed this
Eleventh Day of June, 2019

Andrei Iancu
*Director of the United States Patent and Trademark Office*